United States Patent
Mutschler

(10) Patent No.: US 7,012,677 B2
(45) Date of Patent: Mar. 14, 2006

(54) OPTOELECTRONIC ANGLE MEASURING INSTRUMENT AND METHOD FOR ITS PRODUCTION

(75) Inventor: Reinhold Mutschler, Villingen-Schwenningen (DE)

(73) Assignee: Stegman GmbH & Co. KG, Donaueschingen (DE)

( * ) Notice: Subject to any disclaimer, the term of this patent is extended or adjusted under 35 U.S.C. 154(b) by 266 days.

(21) Appl. No.: 10/606,669

(22) Filed: Jun. 26, 2003

(65) Prior Publication Data
US 2004/0140422 A1    Jul. 22, 2004

(30) Foreign Application Priority Data
Jun. 28, 2002  (DE) ................................. 102 29 246

(51) Int. Cl.
*G01B 11/26* (2006.01)
(52) U.S. Cl. ................... 356/138; 250/231.13; 33/1 N; 33/1 PT
(58) Field of Classification Search ................ 356/138; 250/216, 231.13, 231.14, 231.16, 231.17, 250/231.18; 341/11, 13, 31; 33/1 N, 1 PT, 33/706, 707
See application file for complete search history.

(56) References Cited

U.S. PATENT DOCUMENTS 6,359,409 B1 *   3/2002   Siraky .................. 318/560
6,615,501 B1 *   9/2003   Skerka et al. .............. 33/324

FOREIGN PATENT DOCUMENTS

| DE | 4339083 A1   | 6/1994  |
| DE | 19750474 C2  | 6/1999  |
| DE | 10025410 A1  | 12/2001 |
| EP | 0927873 A1   | 7/1999  |
| EP | 1006368 A2   | 6/2000  |
| EP | 1189035 A2   | 3/2002  |

* cited by examiner

Primary Examiner—Gregory J. Toatley, Jr.
Assistant Examiner—Roy M. Punnoose
(74) Attorney, Agent, or Firm—Townsend and Townsend and Crew LLP

(57) ABSTRACT

An optoelectronic angle measuring instrument, and method for its production, which optoelectronically detects the angle of rotation of an input shaft by means of a dimensional standard connected to the shaft. Light from a light source is parallel-collimated by a collimator lens, modulated by the dimensional standard, and detected by a sensor receiver. The light transmitter, the collimator lens, the dimensional standard and the sensor receiver are arranged concentrically, so that the axis of rotation substantially coincides with the optical axis. At least an end portion of the shaft, as the mechanical component, and the refractive collimator lens, as the optical component of the angle measuring instrument, are made from a single plastic part which accommodates the light source and additional electronic components.

15 Claims, 5 Drawing Sheets

OPTOELECTRONIC ANGLE MEASURING INSTRUMENT AND METHOD FOR ITS PRODUCTION

BACKGROUND OF THE INVENTION

Angle measuring instruments are in industrial use on rotary and spindle axes, on electrical motors and especially on servomotors for controlling and regulating, as well as for positioning, especially in the machine tool industry and in manufacturing and handling mechanisms.

According to the state of the art, in order to measure the angle, one illuminates an optical dimensional standard, also known as a scale, preferably with parallel collimated light. The scale consists of lithographically produced chrome structures on a glass or plastic carrier. An angular movement of the scale relative to a sensor modulates the light impinging on the sensor. The angle information is present in binary encoded form on the scale, is detected by the sensor and is converted into electrical signals.

There are two kinds of angle encoding: incremental and absolute codes. Incremental codes are periodic line codes that are counted and thus document annular changes. However, they do not indicate the absolute angular position. Therefore, the scales often have a reference marking on a separate code track which, when moved across, determines a reference angle position, a so-called null position, and such scales are known as quasi-absolute. If one wishes to determine the absolute angular position, one incrementally counts back starting from the null position.

In contrast, so-called absolute angle measuring instruments always have a definite position, since the scale contains binary encoded position information. Common codes include, besides a binary code, which is encoded according to the law of formation of binary numbers, also a gray code or a random code. Codes formed according to the nonius or vernier technique are also used in industrial measuring systems. For this, line divisions with slightly different period lengths are arranged on at least two code tracks which, when sampled jointly, furnish an absolute position code.

A dimensional standard according to the Moiré principle consists of light and dark areas, formed by a photolithographically structured chromium layer deposited on a carrier substrate that is generally made of glass or plastic, which define an amplitude lattice that modulates the amplitude of the light.

For the scanning of the scale, a diaphragm is arranged in front of the electro-optical sensors, which consist of photosensitive semiconducting layers and which can be integrated on a chip if desired, or one can use semiconductor surfaces structured according to a dimensional standard.

The dimensional standard (10) is illuminated by an illuminating unit which has a light source (20), generally a light emitting diode (LED) emitting in the infrared spectrum, as well as collimator optics (30) for parallel bundling the emitted light. The collimator optics (30) usually is a glass lens, although it can also be made of plastic. The illumination unit is generally firmly joined to a stator.

In contrast to glass lenses, lenses of plastic materials can be more economically mass produced since a spherical or aspherical surface configuration of plastics is easier to attain than one of glass. Furthermore, plastics are easier to handle and grinding or polishing of the lens surface afterwards is unnecessary. Oftentimes the optical quality of injection molded plastic lenses is adequate for collimator optics of low luminous efficiency.

However, the production of plastic lenses and the fabrication of devices which contain plastic lenses present some problems. Plastic lenses are generally produced by injection molding. The plastic lens must have a shoulder so that it can be grasped and installed. Furthermore, mechanical stresses occur inside the plastic material during the fabrication of the lens because the spraying point merges directly in the lens surface, which afterwards can result in stress crack corrosion when subjected to temperature cycles, mechanical loading, or a solvent atmosphere. Therefore, a press-fitting or even a gluing of the plastic lenses when installing them in rotational angle measurement systems are not without problems.

In the case of the rotational angle measuring instruments described in German patent DE 197 50 474 C2 and U.S. Pat. No. 6,359,409 B1, the sensor is arranged concentrically over the shaft and the illumination unit is installed centrally in the shaft of the instrument and rotates with it. In such a case, the required energy has to be furnished by an appropriate mechanism. This can occur inductively, capacitively, or with slip contacts. Parts of the energy transmission mechanism (e.g. slip rings, capacitor plates or a coil with a coil former) are electrically connected to the illumination unit and also rotate with the shaft of the instrument. In the case of a capacitive or inductive energy coupling, additional electronic components such as rectifier diodes, capacitors, etc. are integrated in the illumination unit outside of the LED. Preferably, the electronic components as well as the light source are placed on a board. The light source is then preferably arranged as a Chip-on-Board (COB). For this, the non-encapsulated chip is directly bonded to the board and then encapsulated with a transparent substrate.

SUMMARY OF THE INVENTION

The purpose of the invention is to integrate as many components as possible that are needed for measuring the rotational angle in an opto-mechanotronic component. This is especially helpful in the case of a central scanning, for in this case additional components are necessary for transmitting energy into the rotating shaft.

This purpose is accomplished with a multifunctional plastic molded part, which combines the functions of a collimator lens, a holder for the dimensional standard, a coil former, a holder for the LED board, and a centering device.

In particular, by molding or integrating the plastic lens in a component surrounding the lens, substantially fewer mechanical stresses arise inside the lens and the need for mounting the lens is eliminated. The formation of stress crack corrosion is thereby substantially eliminated.

The invention is especially advantageously configured when, as in FIG. 3, an angle measuring instrument is constructed in a concentric arrangement, as is suggested by German patent DE 197 50 474 C2. Here, the optical axis (2) of the illumination system, formed by an infrared (IR) LED (20) and a collimator lens (30), and the axis of rotation (3) of the instrument (1) are ideally identical. Moreover, the center point of the code disk (10) coincides with the axis of rotation, for otherwise positional deviations would occur because of an eccentricity of the code disk (10). The sensor (50) and the code disk are likewise arranged concentric with each other, with the sensor (50) lying at a slight distance away from the code disk (10).

Currently manufactured shaft encoders have a separate dimensional standard in the form of a code disk, which is fastened to the shaft of the measurement system. Generally the code disk is glued to the shaft. Before this is done, the code disk must be oriented on the shaft so that the center point of the code disk lies at the center of rotation of the shaft, in order to avoid an eccentric running, which causes measurement errors.

Code disks according to the state of the art generally have photolithographically structured chrome layers on glass or plastic and are lithographically produced on large sheets and afterwards broken apart. By contrast, the use of microstructurized code disks has the benefit of cheap production by virtue of the possibility of mass production using micro-injection molding or embossing techniques, along with the advantage that they can be made as a single piece together with additional components of the encoder, such as the shaft or the collimator lens.

Further, these photolithographically produced layers can be positioned with precise concentricity directly on the multifunctional plastic molded part employed by this invention, thanks to the integration of precise center references, so that a separate adjustment and mounting of the code disk is unnecessary.

On the other hand, the use of microstructurized code disks has the benefit of being relatively inexpensive because they can be mass produced using micro-injection molding or embossing techniques, along with the advantage that they can be made as a single piece together with additional components of the encoder, such as the shaft or the collimator lens. Other than making the replication tool, no additional photolithographic processes are required. For comparison, also see German patent application DE 100 25 410.

Particular benefits of the invention are a reduction of costs, improved reliability, and simplified assembly by combining a large number of different functions in a single component.

Furthermore, as a result of the integration of the collimator lens in a larger component, the mechanical stresses arising in the lens from the plastic molding process can be reduced, as is described hereafter.

The production of plastic lenses, as well as the fabrication of devices which contain plastic lenses, present certain problems. Plastic lenses are normally made by injection molding.

In the past, plastic lenses were molded from plastic using one or more injection points. Because the injection points merge directly into the lens mold, stresses arise in the plastic material from these injection points due to pressure differences during the injection process and also during cool-down. Under unfavorable environmental conditions, such as an atmosphere saturated with polar substances, application of glue, or temperature fluctuations, such material stresses can lead to so-called stress crack corrosion (SPRK), i.e. cracks resulting from the maximum material stresses in the plastic and propagating from the lens surface into the interior of the plastic material. Mounting a lens in a holder by gluing or clamping it can therefore result in the formation of surface cracks.

Since the lens (30) of the invention is molded in a mold part (100), the injection point or points do not merge directly in the lens mold (30), so that practically no stresses are formed in the lens mold. The danger of stress crack corrosion (SPRK) within the lens mold (30) is therefore extremely slight.

The injection point is that place on the plastic molding die through which the plastic, heated to its above solidification temperature, flows into the die cavity. It is possible to use several injection points for each plastic part. The plastic material remaining at the injection point is removed from the molded piece after the cool-down.

The configuration of the lens in the rotational angle measuring system of the present invention overcomes these problems. Besides eliminating the need for mounting the lens, considerably fewer mechanical stresses arise within the lens, principally because the plastic lens is molded and becomes integrated into an additional functional component. This largely eliminates the risk that stress crack corrosion will occur.

The invention is especially advantageous when a diffractive dimensional standard (10) is used in addition. This is provided with encoded diffractive optical elements (DOEs), for example in the form of transmissive line diffraction lattices according to German laid-open application DE 100 25 410 A1, which modulate the light and thus generate an incremental or absolute position value. It is possible to combine the collimator lens (30), or also an imaging lens, which images the scale (10) on the receiver (50), with the DOEs of the scale (10) to form an integrated refractive-diffractive microoptical system.

The common component (1) which contains the collimator lens (30) can also be produced in the two-component injection molding process. For this, two plastic materials are used in a single injection molding die, so that the part (100) contains components of a first and additional components of a second plastic material. This takes advantage of the differing properties of the different components of the common part (100). Thus, for example, the plastic material of the lens (30) can have a high light transmission in the emitted light region of the transmitter. In the case of using a diode emitting in the infrared spectrum, the transmission range would lie in the infrared spectrum. The shaft, on the other hand, can be made of torsionally highly rigid material.

Conventional refractive lenses refract the incident light at the lens surface through the boundary layer of air and glass and the corresponding abrupt change in the index of refraction. Because of a well-defined curvature of the lens surface, one achieves the desired optical property, such as that of a collecting lens.

The invention will now be explained with reference to the drawings.

DESCRIPTION OF THE PREFERRED EMBODIMENTS

Figure 1:
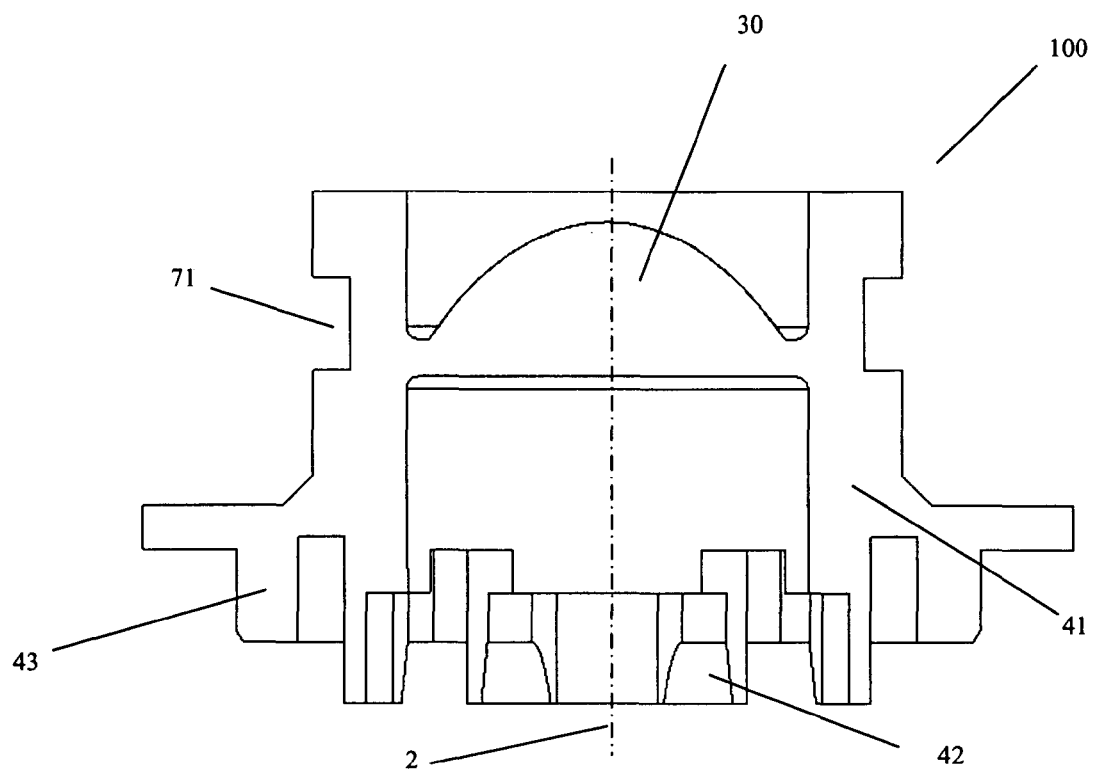
FIGS. 1 and 2 show the multifunctional plastic molded part (100)
Figure 2:
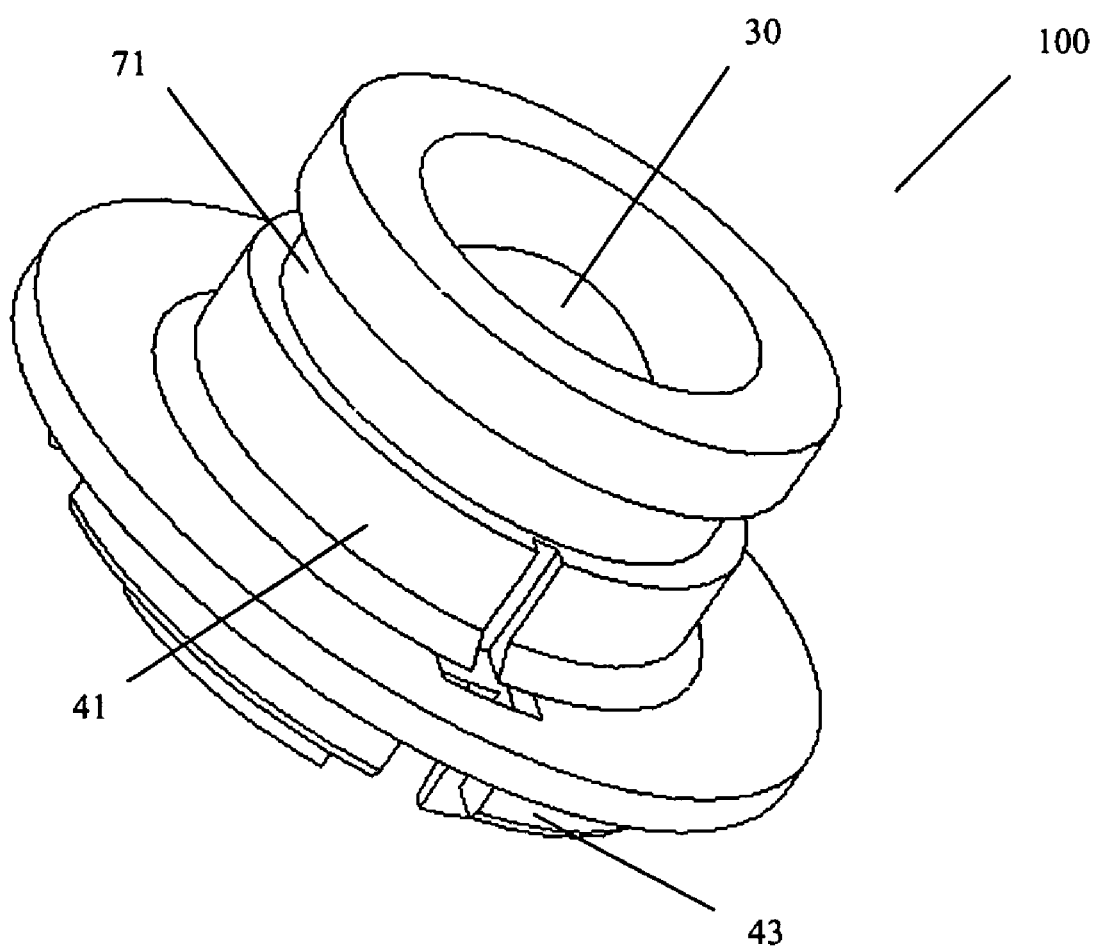
Figure 3:
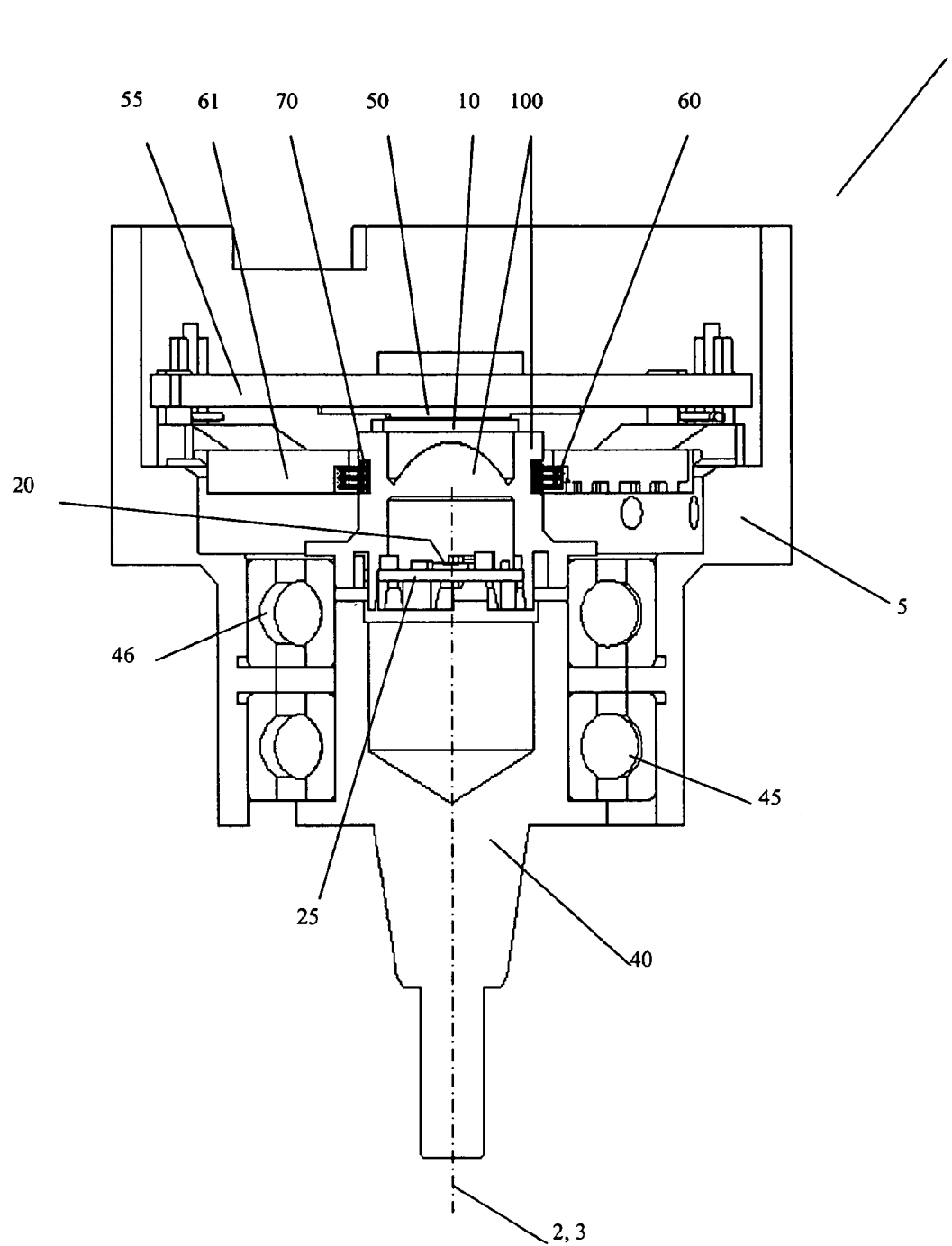
FIG. 3 shows its installation in the rotational angle measuring device of the invention (1)

The structural unit (100) shown in FIGS. 1 and 2, consisting of a collimator lens (30) as well as a shaft shoulder (41), includes the following additional functional units:

indexing projections (42) at the bottom of the part accommodate a transmitter board (25), which carries additional electronic components besides the light transmitter (20); the light transmitter (20) can be placed on the IC board (25) as a chip-on-board, a rotation-symmetrical shoulder (43) is used for press-fitting into an upper bearing (46) or bonding it to the bearing (46), as well as for concentric and axial alignment, a front side of the structural part (100) with a straight edge receives the code disk that carries the dimensional standard (10), which in turn is illuminated by the IR transmitter (20), a recess (71) serves as the coil former for the secondary coil (70), which inductively supplies electrical energy to the IR-LED light transmitter (20).

When using a transmissive code disk, transparent and nontransparent surfaces are alternatingly used. As a rule, glass or plastic is used as the carrier material for the code disk (10). The nontransparent surfaces are generally formed by a thin chromium layer. In the case of diffractive dimensional standards such as those disclosed in DE 100 25 410 A1, the surfaces corresponding to the dark areas of the dimensional standard (10) are microstructurized by diffractive optics. This can be done with phase step diffraction lattices, which are dimensioned such that the zeroth diffraction order is attenuated.

FIG. 1 shows a shaft encoder in cross-section. The plastic part (100) accommodates at its bottom the transmitter board (25) by means of the molded-on holder (42), carrying the light transmitter (20) in the form of a chip-on-board (COB) IR-LED. Furthermore, additional electronic components are arranged on the transmitter board (25). A secondary coil (70) arranged at the periphery of the plastic part (100) provides the transmitter (20) with electrical energy. For this, the secondary coil (70) is arranged as a coreless high-frequency transformer inside a primary coil (60), which is stationary and held by means of a coil former (61). A high-frequency alternating voltage is applied to the primary coil (60).

A centering portion (43) joins the plastic part (100) to upper bearing (46) or to shaft (40).

At its upper side, plastic part (100) carries the dimensional standard (10) in the form of a code disk, which lies a short distance opposite the sensing receiver (50). The sensing receiver (50), in turn, is arranged as a COB on a receiver board (55). Additional electronic components are soldered to the same board by means of an SMD technique.

Figure 4:
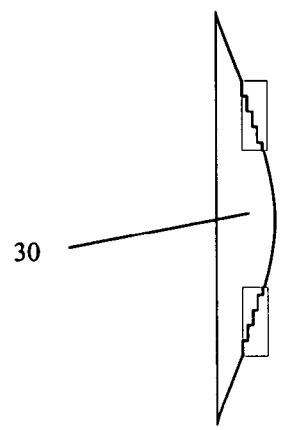
FIG. 4 shows the basic configuration of a stepped lens (30) that can reduce the axial length.

The stepped lens shown in FIG. 4, also known as a Fresnel lens, is designed as a collecting lens and can be used in place of a convex collimator lens.

Figure 5:
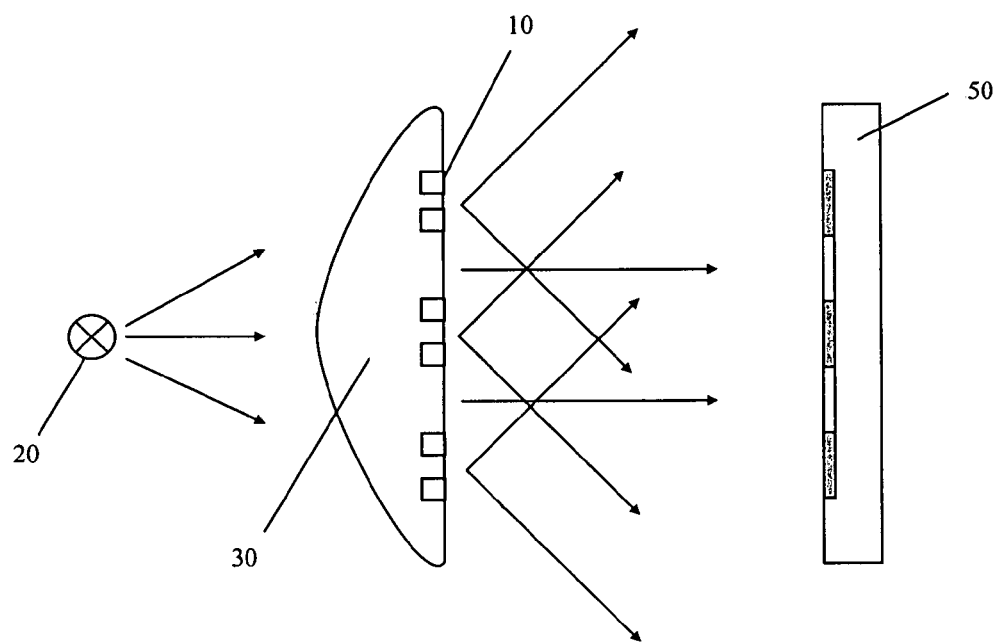
FIG. 5 shows the combination of a collimator lens with a diffractive dimensional standard on the back side.

FIG. 5 shows schematically a combined optical element, consisting of a refractive lens (30) and a diffractive structure in the form of a phase lattice. The diffractive structure represents the dimensional standard (10), in that the light wave emitted by the transmitter (20) and preferably parallel-collimated by the lens (30) is diffracted differently at various places by means of the diffractive structures corresponding to the coding and the receiver (50) receives an amplitude-modulated light signal. Suitable receiver optics are described, for example, in DE 102 26 444.

Figure 6:
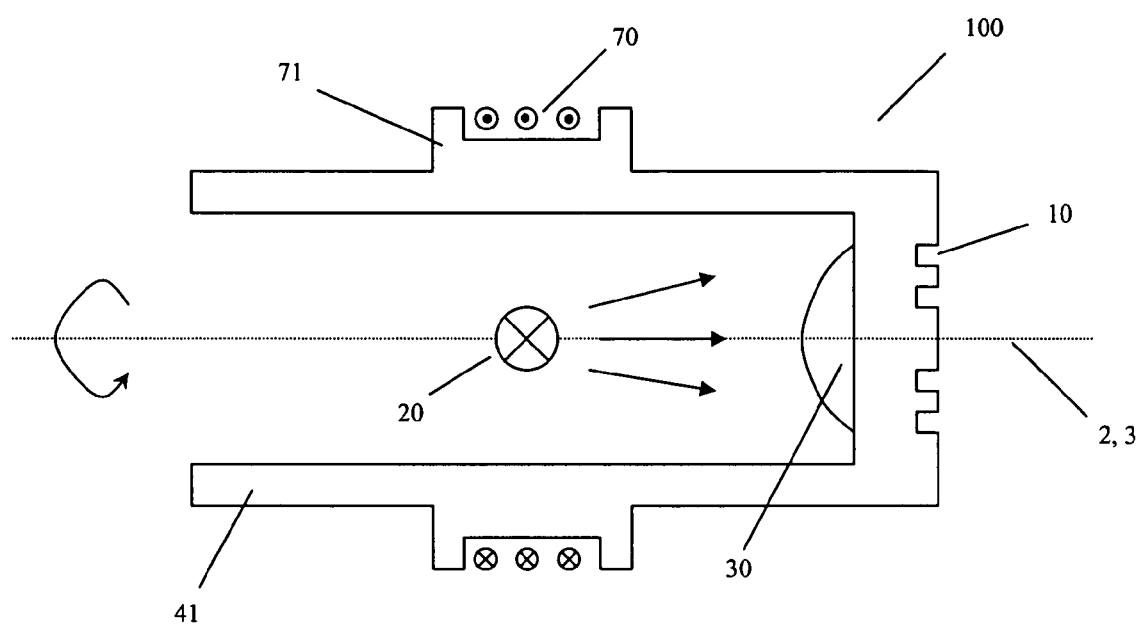
FIG. 6 shows schematically its integration in a multifunctional part.

Finally, FIG. 6 shows schematically how the combined optical element shown in FIG. 5, consisting of a refractive lens (30) and its diffractive microstructurizing, which represents the angle code (10), is integrated in unified plastic part (100). The light transmitter (20) is arranged inside the part (100) and supplied with electric energy by means of the secondary coil (70), which is wound about part (100) at the coil former (71). This is a centralized arrangement; the optical axis (2) coincides with the axis of rotation (3) of the angle measuring unit (1).

The plastic part (100) includes a shaft portion (41) which defines the end piece of the shaft (40) of the angle measuring instrument (1).

The injection molding die has the negative shape of plastic part (100) that is being molded. The anticipated shrinkage of plastic part (100) after injection molding is preferably factored into the production of the die shape, so that the finished plastic part (100), and especially the collimator lens (30) as the optical component thereof, has the desired mechanical dimensions.

The invention is especially beneficial when using aspherical lens surfaces, which are costly to produce when made of glass. Aspherical lens surfaces not only enable the correction of imaging errors which can occur with spherical lens surfaces, especially so-called thick lenses where the lens diameter is not much larger than the maximum thickness of the lens, they also enable an adaptation to the light transmitter (20), which in reality does not generate an ideal pointlike beam, but a two-dimensional beam, and an adaptation of the light intensity to the surface being illuminated. The aim is to achieve the most uniform possible distribution of light on the illuminated surface while at the same time having the most parallel possible path of the light after the light from transmitter (20) passes through the collimator lens (30).

The invention claimed is:

1. Optoelectronic angle measuring instrument with a dimensional standard, a light source, a collimator lens and a sensor receiver, wherein light emitted from the light source is parallel-collimated by the collimator lens, modulated by the dimensional standard, which is non-rotatably connected to a shaft of the instrument, and detected by the sensor receiver, wherein the light source, the collimator lens, the dimensional standard and the sensor receiver are arranged so that an axis of rotation substantially coincides with an optical axis, characterized in that both at least an end piece of the shaft as a mechanical component and the refractive collimator lens as an optical component of the instrument are formed as a single plastic part which accommodates the light source and additional electronic components.

2. Optoelectronic angle measuring instrument according to claim 1, including a coil former for a secondary coil, and a board holder for a transmitter board which mounts the light source and additional electronic components, and a centering device molded to the single plastic part.

3. Optoelectronic angle measuring instrument according to claim 1, wherein the dimensional standard is a diffractive dimensional standard that is sampled and molded to the single plastic part.

4. Optoelectronic angle measuring instrument according to claim 1, characterized in that the plastic part is an injection molded part made from at least one plastic component.

5. Optoelectronic angle measuring instrument according to claim 1, characterized in that a surface of the lens is aspherical in shape.

6. Optoelectronic angle measuring instrument according to claim 1, characterized in that a surface of the lens is configured as a stepped lens in order to reduce its axial installation space.

7. Optoelectronic angle measuring instrument according to claim 1, characterized in that the plastic part is substantially transparent to infrared light.

8. Optoelectronic angle measuring instrument according to claim 5, characterized in that the light source and a transmitter board are encased by the plastic part.

9. Optoelectronic angle measuring instrument according to claim 1, characterized in that the plastic part has a molded-on centering device connected to a ball bearing or a shaft portion whose angular position is to be measured.

10. Method for producing an optoelectronic angle measuring instrument with a dimensional standard, a light source, a collimator lens and a sensor receiver, wherein the light emitted by the light source is parallel-collimated by the collimator lens, modulated by the dimensional standard which is non-rotatably connected to a shaft of the instrument, and detected by the sensor receiver, characterized in that both at least an end portion of the shaft and the refractive collimator lens are made from a single plastic part, and the light source, a receiver coil and additional electronic components are encased by the single plastic part.

11. Method according to claim 10, characterized by positioning the light transmitter arranged on a board in the injection molding die, and thereafter injection molding the plastic part.

12. Method according to claim 10, characterized by giving the injection molding die the negative shape of a curved surface of the collimator lens.

13. Method according to claim 10, characterized by providing the lens with a stepped lens surface.

14. Optoelectronic angle measuring instrument comprising a dimensional standard, a light source, a collimator lens and a sensor receiver arranged on an optical axis, the dimensional standard being non-rotatably connected to an end piece of a rotatable shaft which is rotatable about an axis of rotation, the axis of rotation substantially coinciding with the optical axis, at least the end piece of the shaft and the collimator lens being formed as a single plastic part.

15. Optoelectronic angle measuring instrument according to claim 14 wherein the light source and additional electronic components are incorporated in the single plastic part.

* * * * *